(12) United States Patent
Dornik

(10) Patent No.: US 11,925,998 B2
(45) Date of Patent: Mar. 12, 2024

(54) MECHANICAL METAL JOINT FOR VEHICLE COMPONENT

(71) Applicant: Ford Global Technologies, LLC, Dearborn, MI (US)

(72) Inventor: Nicholas Dornik, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/724,964

(22) Filed: Apr. 20, 2022

(65) Prior Publication Data
US 2023/0339040 A1  Oct. 26, 2023

(51) Int. Cl.
| | | |
|---|---|---|
| *B23K 20/00* | (2006.01) | |
| *B23K 20/12* | (2006.01) | |
| *B23K 101/00* | (2006.01) | |
| *B23K 103/04* | (2006.01) | |
| *B23K 103/10* | (2006.01) | |

(52) U.S. Cl.
CPC .... *B23K 20/1205* (2013.01); *B23K 2101/006* (2018.08); *B23K 2103/04* (2018.08); *B23K 2103/10* (2018.08)

(58) Field of Classification Search
CPC .. B23K 20/1295; B23K 20/129; B23K 20/12; B23K 20/127; F16B 19/06
See application file for complete search history.

(56) References Cited

U.S. PATENT DOCUMENTS

| | | | | |
|---|---|---|---|---|
| 3,848,389 A | * | 11/1974 | Gapp | F16B 19/06 16/385 |
| 6,230,958 B1 | * | 5/2001 | Coletta | B23K 20/129 228/114.5 |
| 6,253,987 B1 | * | 7/2001 | Coletta | B23K 20/129 228/114.5 |
| 6,880,743 B1 | * | 4/2005 | Coletta | B23K 20/1295 228/2.1 |
| 8,540,134 B2 | * | 9/2013 | Bezaire | B23K 20/1285 228/2.1 |
| 9,849,539 B2 | | 12/2017 | Kadoya et al. | |
| 11,161,196 B2 | | 11/2021 | Nakai et al. | |
| 2020/0030907 A1 | | 1/2020 | Kadoya | |

FOREIGN PATENT DOCUMENTS

| | | |
|---|---|---|
| JP | 2011005507 | 1/2011 |
| KR | 101971028 | 4/2019 |

* cited by examiner

Primary Examiner — Erin B Saad
(74) Attorney, Agent, or Firm — Burris Law, PLLC

(57) ABSTRACT

A system for forming a vehicle component includes a first metal sheet having an aperture, a second metal sheet contacting a lower surface of the first metal sheet, an anvil supporting the first and second metal sheets beneath the aperture, and a press bit disposed above the aperture.

15 Claims, 7 Drawing Sheets

MECHANICAL METAL JOINT FOR VEHICLE COMPONENT

FIELD

The present disclosure relates to mechanical joining of metal sheets to form a vehicle component, and systems for joining the metal sheets.

BACKGROUND

The statements in this section merely provide background information related to the present disclosure and may not constitute prior art.

A variety of materials are often joined together in applications such as automobiles and are configured to meet specific operational requirements and conditions. Automotive manufacturers are increasingly using advanced materials to reduce weight and thus increase fuel economy. These materials include aluminum, carbon fiber composites, and magnesium, among others. The tailored use of advanced materials for components being joined, such as for a vehicle roof, can address weight constraints better than conventional all steel or all aluminum designs. However, mechanically joining dissimilar materials may be difficult with conventional methods such as welding and adhesives.

These issues related to the mechanical joining of dissimilar materials are addressed by the present disclosure.

SUMMARY

This section provides a general summary of the disclosure and is not a comprehensive disclosure of its full scope or all of its features.

In one form, a method for joining a first metal sheet to a second metal sheet includes placing the first metal sheet onto the second metal sheet, translating a rotating bit through an aperture of the first metal sheet and onto a surface of the second metal sheet to form a volume of heated metal from the second metal sheet, wherein a diameter of the aperture is greater than a diameter of the rotating bit to form an annulus, and flowing the heated metal from the second metal sheet along the translating and rotating bit, back through the aperture of the first metal sheet, and onto an outer surface of the first metal sheet.

In variations of the method, which may be implemented individually or in combination: the method further includes solidifying the flowed metal to form a cap extending around an upper portion of the aperture in the first metal sheet; the bit further includes a flange arranged to direct the heated metal onto the outer surface of the first metal sheet; the method further includes heating the surface to a semisolid state to form semisolid metal and, then, flowing the semisolid metal from the surface of the second metal sheet onto the outer surface of the first metal sheet; the bit has a substantially flat bottom surface; the bit has a protrusion extending from a bottom surface; the method further includes pressing the rotating bit to a specified depth through the second metal sheet and, then, translating the bit away from the surface of the second metal sheet; the first metal sheet and the second metal sheet are dissimilar materials; the method further includes flowing the heated metal between the outer surface of the first metal sheet and a flange of the rotating bit to contact the flange; flowing the heated metal along the bit beyond the diameter of the aperture of the first metal sheet; flowing the heated metal to form an annulus of the heated metal having an outer diameter greater than the diameter of the aperture; the joined first and second metal sheet form a vehicle component; a melting temperature of the second metal sheet is lower than a melting temperature of the first metal sheet; the first metal sheet has a chamfered surface extending from the outer surface of the first metal sheet to the aperture; the method further includes flowing heated metal onto the chamfered surface and onto the outer surface of the first metal sheet.

In another form, a system for forming a vehicle component includes a first metal sheet having an aperture, a second metal sheet contacting a lower surface of the first metal sheet, an anvil supporting the first and second metal sheets beneath the aperture, and a press bit disposed above the aperture.

In variations of the system, which may be implemented individually or in combination: the press bit is rotatable to heat a surface of the second metal sheet to a semisolid state, and wherein the press bit is translatable against the surface of the second metal sheet toward the anvil to flow heated metal from the surface of the second metal sheet through the aperture along the press bit and onto an outer surface of the first metal sheet; the press bit further includes a flange arranged to direct the heated metal onto the outer surface of the first metal sheet.

In another form, a vehicle component includes a first metal sheet joined to a second metal sheet by a joining method, the joining method including placing the first metal sheet onto the second metal sheet, translating a rotating bit through an aperture of the first metal sheet and onto a surface of the second metal sheet to form a volume of heated metal from the second metal sheet, wherein a diameter of the aperture is greater than a diameter of the rotating bit to form an annulus, and flowing the heated metal from the second metal sheet along the translating and rotating bit, back through the aperture of the first metal sheet, and onto an outer surface of the first metal sheet.

In variations of the vehicle component, the joining method further includes solidifying the flowed metal to form a cap extending around an upper portion of the aperture in the first metal sheet.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
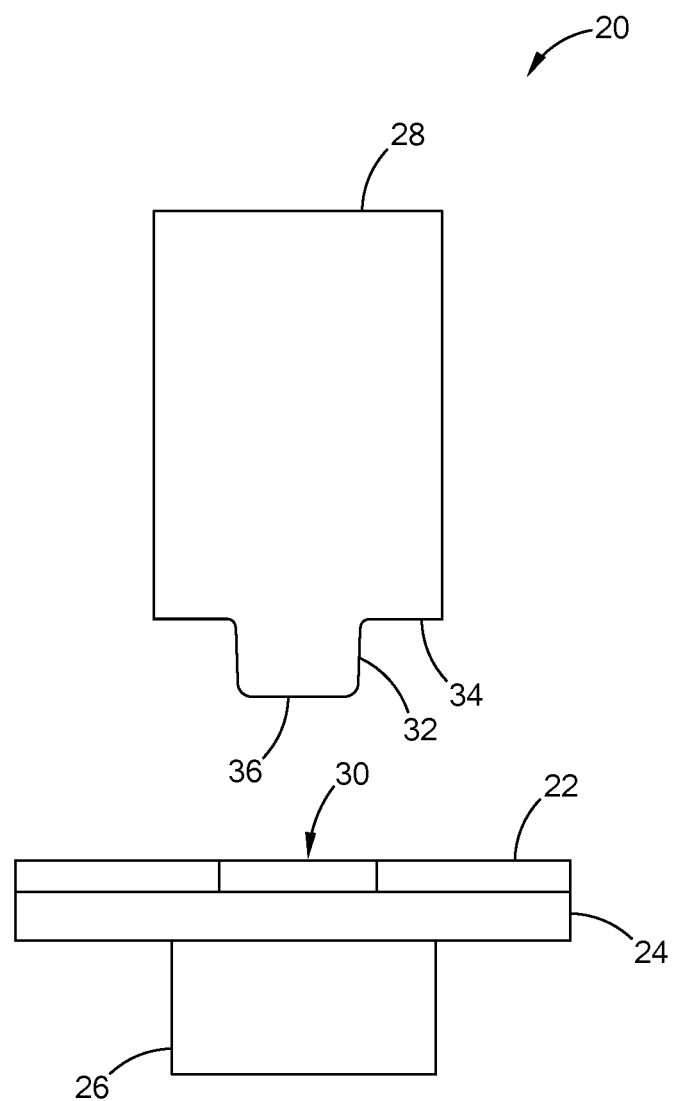
FIG. 1 is a side view of a system for forming a vehicle component according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a system 20 for forming a vehicle component includes a first metal sheet 22, a second metal sheet 24 disposed against or adjacent to the first metal sheet 22, an anvil 26 supporting the first and second metal sheets 22, 24, and a press bit 28 disposed above the first and second metal sheets 22, 24. The first metal sheet 22 defines an aperture 30, and the anvil 26 is disposed beneath the aperture 30. The second metal sheet 24 is disposed between the first metal sheet 22 and the anvil 26. The anvil 26 generally supports the first and second metal sheets 22, 24 during forming of the vehicle component.

In one form, the first metal sheet 22 and the second metal sheet 24 are dissimilar materials. The dissimilar materials provide specified deformation and weight properties to the vehicle component, addressing impact energy absorption and fuel economy constraints for vehicle manufacturing. As one example, the first metal sheet 22 is a steel alloy and the second metal sheet 24 is an aluminum alloy. In such an example, the steel alloy of the first metal sheet 22 improves impact energy absorption of the vehicle component, and the aluminum alloy of the second metal sheet 24 reduces overall weight of the vehicle component. In another form, the first metal sheet 22 and the second metal sheet 24 are of the same material, such as the steel alloy or the aluminum alloy.

The press bit 28 is disposed above the aperture 30 such that the first and second metal sheets 22, 24 are disposed between the anvil 26 and the press bit 28. The press bit 28 is movable to contact the second metal sheet 24 through the aperture 30 of the first metal sheet 22. In the form of FIG. 1, the press bit 28 has a central portion 32 and a flange 34 extending from the central portion 32. The central portion 32 has a substantially flat bottom surface 36 that contacts the second metal sheet 24. In this context, the "substantially flat" bottom surface 36 includes a completely flat surface, a surface with a shallow draft angle, and a surface with a curvature below a curvature threshold. The curvature threshold is determined by a manufacturer to direct metal from the second metal sheet 24 onto the first metal sheet 22, as described below. The flange 34 is configured to extend along the first metal sheet 22 to direct metal flowing from the second metal sheet 24 along the surface of the first metal sheet 22.

Figure 2:
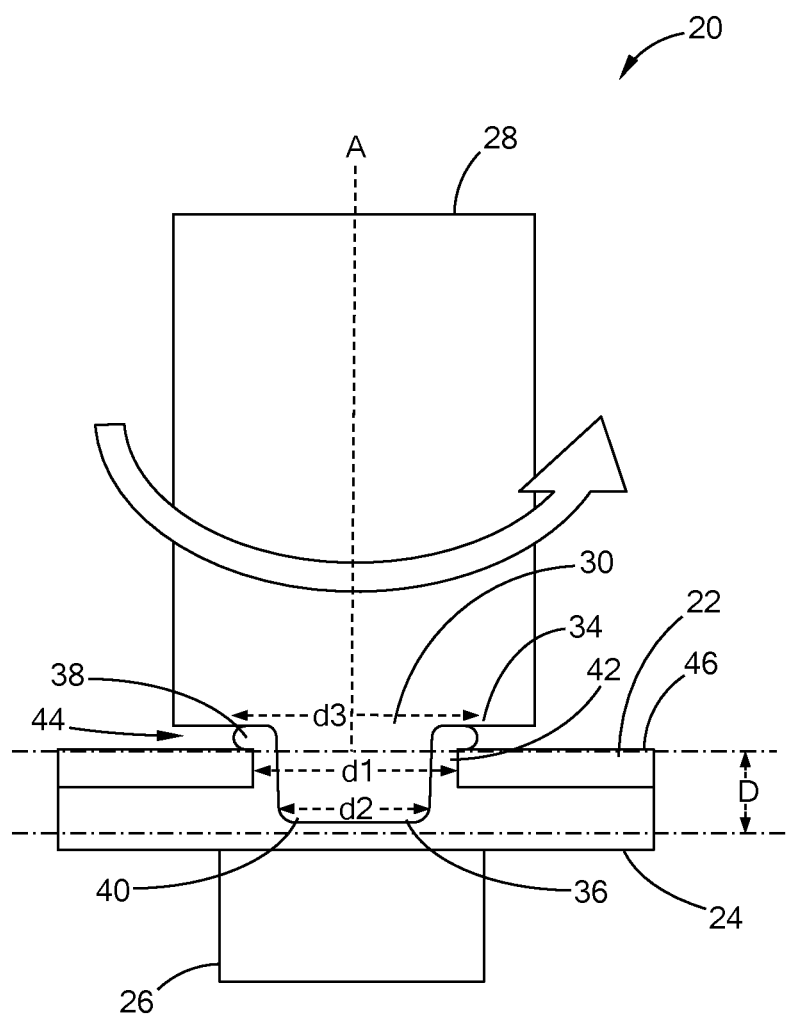
FIG. 2 is a side view of the system in which a press bit rotates against a metal sheet to form a cap according to the present disclosure.

With reference to FIG. 2, the press bit 28 is pressed onto the second metal sheet 24 to join the first and second metal sheets 22, 24. The press bit 28 forms a cap 38 that joins the first metal sheet 22 to the second metal sheet 24. By forming the cap 38, dissimilar metals of the first and second metal sheets 22, 24, such as aluminum and steel, are joined to form the vehicle component.

In operation, to form the cap 38, the press bit 28 is rotated about a central axis A and translated, while rotating, through the aperture 30 onto the second metal sheet 24 to form a surface of the second metal sheet 24. More particularly, friction between the rotating press bit 28 and an initial surface of the second metal sheet 24 heats the initial surface of the second metal sheet 24 forming a volume of heated semisolid metal 42 from the second metal sheet 24. In one form, a diameter d1 of the aperture 30 is greater than a diameter d2 of the central portion 32 of the bit 28 such that the press bit 28 does not contact the first metal sheet 22. An annulus of heated metal 42 forms between the press bit 28 and the first metal sheet 22. The heated metal 42 is in a semisolid state such that the heated metal 42 flows into a gap 44 between the flange 34 of the press bit 28 and an outer surface 46 of the first metal sheet 22. In this context, the "semisolid state" is a plasticized or otherwise flowable state in which pressure from the press bit 28 causes the heated metal 42 to flow or move into the gap 44. In one form, a melting temperature of the second metal sheet 24 is lower than a melting temperature of the first metal sheet 22 such that the second metal sheet 24 enters the semisolid state before the first metal sheet 22 upon heating by the rotating press bit 28.

To flow the heated metal 42, the rotating press bit 28 is pressed to a specified depth D along the central axis A relative to a neutral position. The neutral position is a predetermined value, such as a height at which the bit 28 first contacts the second metal sheet 24. Then, the press bit 28 is translated, while rotating, until a controller (not shown) determines that the press bit 28 has translated to the specified depth D. The press bit 28 is translated by a suitable device, such as a motor or a linear actuator (not shown).

The pressing of the press bit 28 onto the second metal sheet 24 causes the heated metal 42 to flow. The metal 42 flows through the aperture 30 onto the outer surface 46 of the first metal sheet 22, and along the flange 34 of the press bit 28. The anvil 26 inhibits the heated metal 42 from flowing downward away from the press bit 28. The heated metal 42 flows along the flange 34 of the press bit 28 beyond the diameter d1 of the aperture 30. The heated metal 42 forms an annulus having an outer diameter d3 greater than the diameter d1 of the aperture 30. The annulus of heated metal 42, upon solidifying into the cap 38, secures the second metal sheet 24 to the first metal sheet 22.

Figure 3:
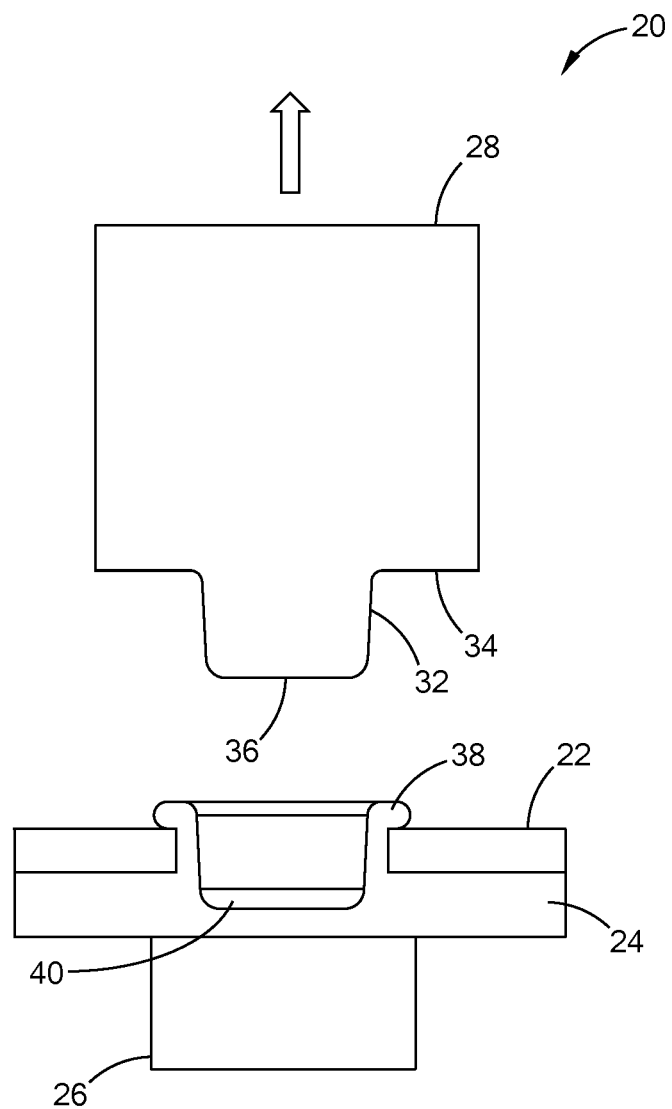
FIG. 3 is a side view of the press bit removed from the cap to form the vehicle component according to the present disclosure.

With reference to FIG. 3, the press bit 28 is translated away from the surface 40 of the second metal sheet 24 to allow the cap 38 to solidify. In the form of FIG. 3, the press bit 28 has stopped rotating. Alternatively, the press bit 28 may be translated away from the surface 40 while still rotating. The friction that heated the second metal sheet 24 also heated the press bit 28, and the heated metal 42 that has flowed onto the first metal sheet 22 may remain in the semisolid state while the bit 28 contacts the surface 40 of the second metal sheet 24. Upon reaching the specified depth D shown in FIG. 2, the press bit 28 remains against the second metal sheet 24 for a specified period of time to allow the heated metal 42 to flow to a specified outer diameter d3 of the cap 38. The specified period of time is determined by empirical testing, including pressing the rotating bit onto test metal sheets for periods of time and measuring the diameters of the caps that form for each of those periods of time. Then, the rotating press bit 28 is translated away from the surface 40 of the second metal sheet 24 to have the heated metal 42 cool and solidify into a solid cap 38.

Figure 4:
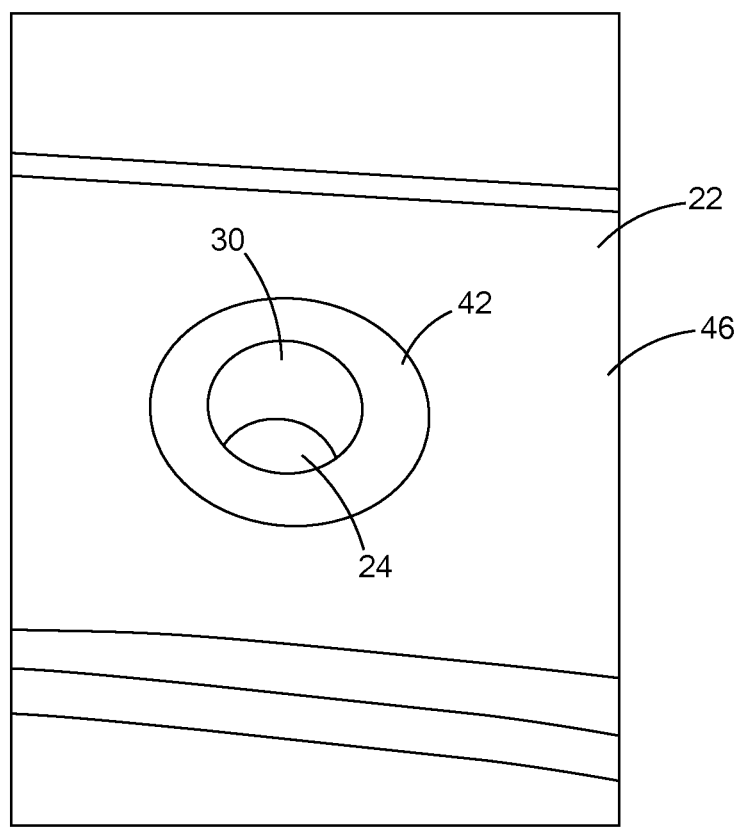
FIG. 4 is a perspective view of the vehicle component with the cap formed according to the present disclosure.

With reference to FIG. 4, the cap 38 solidifies to join the first metal 22 sheet to the second metal sheet 24. The cap 38 extends around the upper portion of the aperture 30 on the outer surface 46 of the first metal sheet 22, extending beyond the outer diameter of the aperture 30 as described above. By extending beyond the aperture 30, the cap 38 adds additional strength from geometric interlocking with the first metal sheet 22. The cap 38 absorbs loads applied to the component, reducing deformation of the first and second metal sheets 22, 24. That is, the additional strength provided by the cap 38 reduces the likelihood of the joining of the first and second metal sheets 22, 24 to fail. In the form of FIGS. 1-4, one cap 38 is shown, and it is within the scope of the disclosure to form more than one cap to join the first and second metal sheets 22, 24. That is, the first metal sheet 22 can include a plurality of apertures 30, and the press bit 28 can form a cap 38 from metal flowed from the second metal sheet 24 in each aperture 30, forming a plurality of caps 38.

Figure 5:
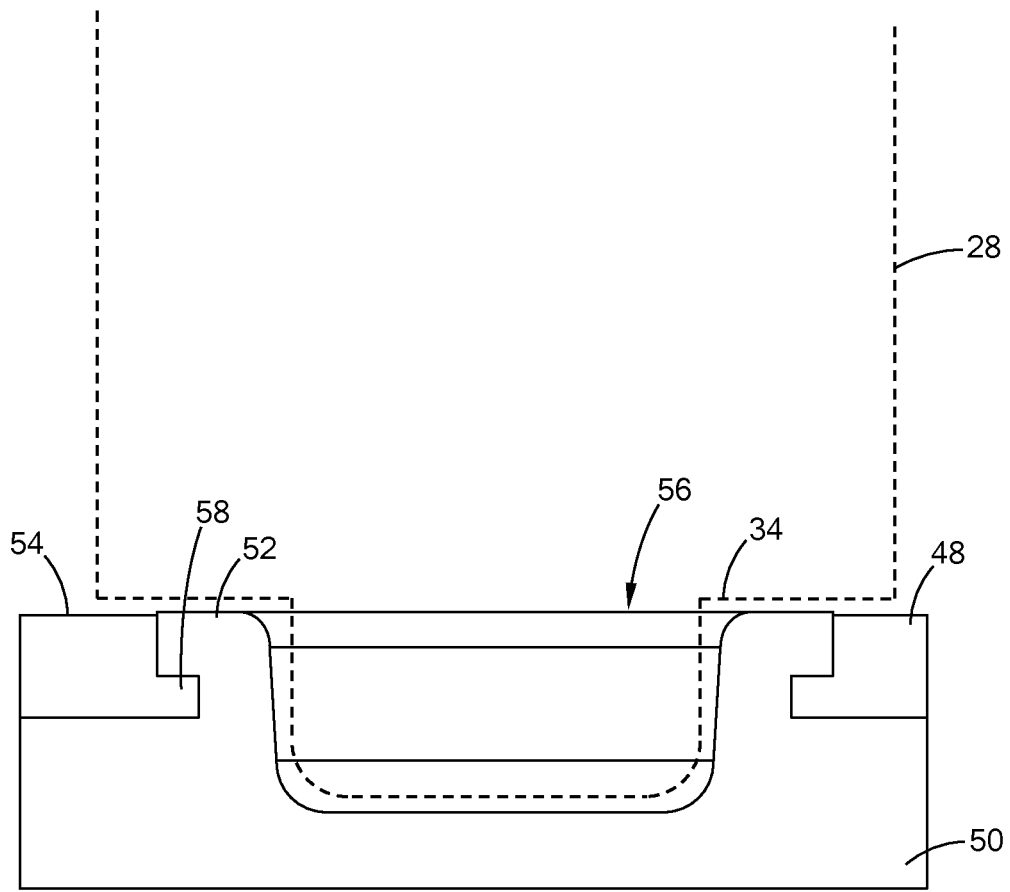
FIG. 5 is a cross-sectional view of another cap formed flush with an outer surface of a vehicle component according to the present disclosure.

With reference to FIG. 5, a component includes a first metal sheet 48 and a second metal sheet 50. A cap 52 joins the first metal sheet 48 to the second metal sheet 50. In the form of FIGS. 2-4, the cap 38 extends above the outer surface 46 of the first metal sheet 22, and in the form of FIG. 5, the cap 52 is flush with an outer surface 54 of the first metal sheet 48. An aperture 56 of the first metal sheet 48 defines a ledge 58 of the first metal sheet 48 onto which the heated metal flows. In FIG. 5, the press bit 28 that forms the cap 52 is shown in dashed lines. The flange 34 of the press bit 28 contacts the outer surface 54 of the first metal sheet 48 such that the semisolid metal flows from the second metal sheet 50 onto the ledge 58 of the first metal sheet 48. Then, upon removal of the press bit 28, the heated metal solidifies onto the ledge 58, forming the cap 52 thereon. By forming the cap 52 within the first metal sheet 48 and flush with the outer surface 54, the cap 52 joins the sheets 48, 50 together without protruding beyond the first metal sheet 48. The flush cap 52 thus addresses space constraints where the cap 52 may otherwise not fit within the component and allows for a thinner cap 52, reducing the amount of metal flowed from the second metal sheet 50.

Figure 6:
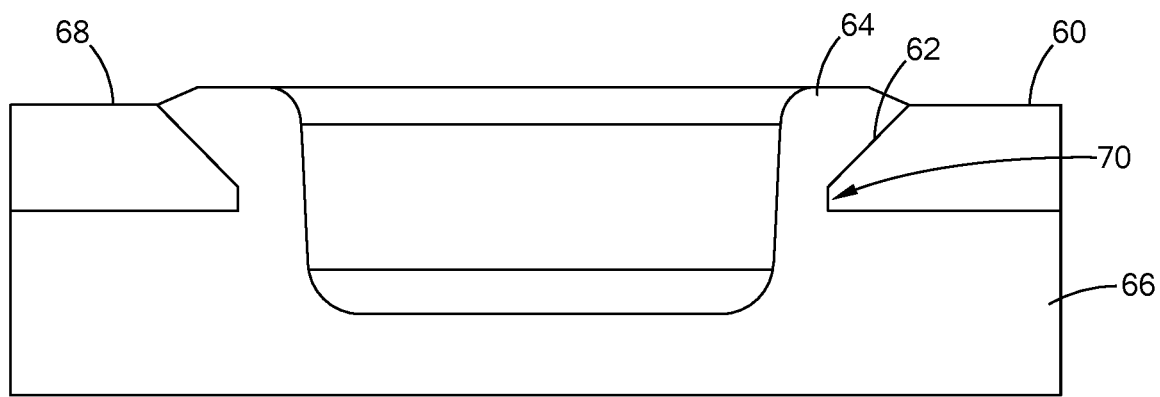
FIG. 6 is a cross-sectional view of another cap formed along a chamfered surface of a vehicle component according to the present disclosure.

With reference to FIG. 6, a first metal sheet 60 of a component includes a chamfered surface 62 onto which a cap 64 is formed from a second metal sheet 66. In the form of FIG. 6, the chamfered surface 62 extends from an outer surface 68 of the first metal sheet to an aperture 70 defined in the first metal sheet 60. As described above, a rotating press bit (not shown in FIG. 6) is pressed through the aperture 70 onto the second metal sheet 66, and semisolid metal from the second metal sheet 66 flows onto the outer surface 68 of the first metal sheet 60. The semisolid metal flows along the chamfered surface 62 to the outer surface 68, solidifying along the chamfered surface 62. The cap 64 along the chamfered surface 62 absorbs loads in the vertical direction more readily than the cap 38 with a flat vertical surface, as shown in FIGS. 1-4. Thus, the chamfered surface 62 improves the strength of the cap 64. In the form of FIG. 6, the cap 64 extends above the outer surface 68 of the first metal sheet 60, and it is within the scope of the disclosure that the cap 64 may extend along the chamfered surface 62 and be substantially flush with the outer surface 68 of the first metal sheet 60. The cap 64 is thinner than the cap 52 of FIGS. 1-5, reducing an amount of metal flowed from the second metal sheet 66.

Figure 7:
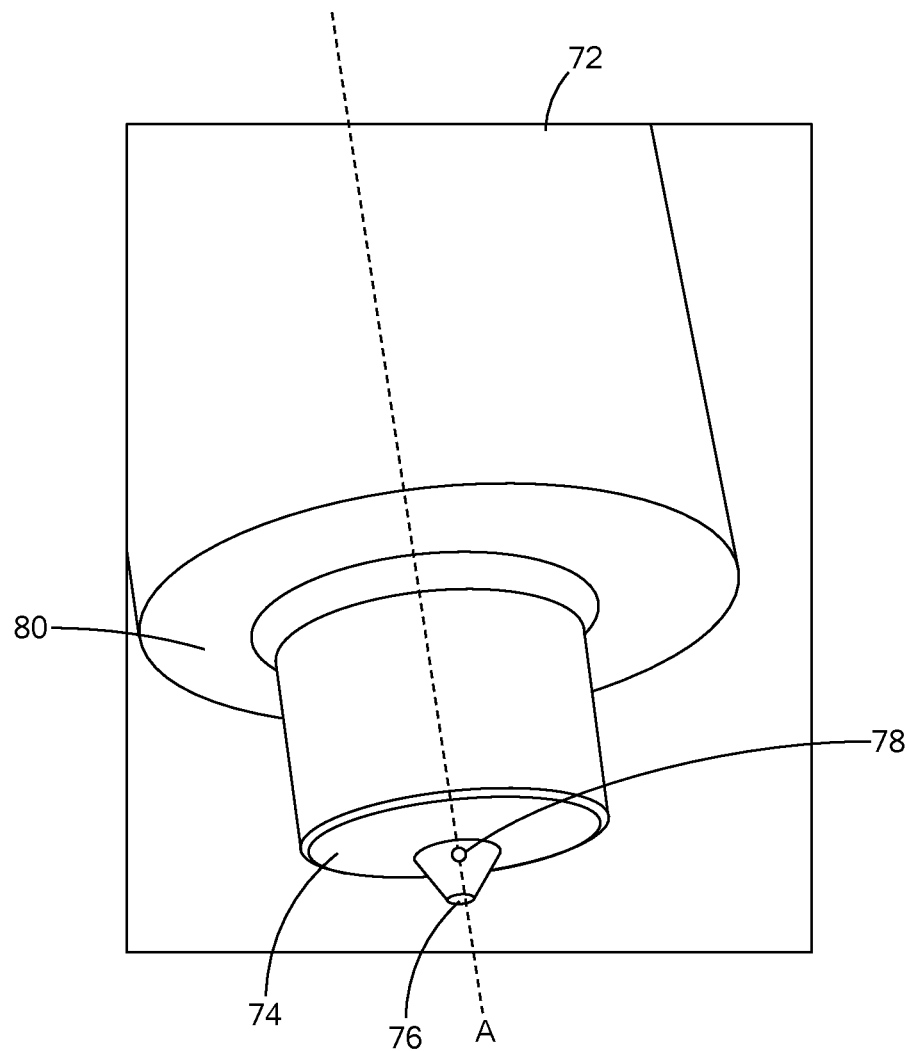
FIG. 7 is a perspective view of another press bit of the system for forming the vehicle component according to the present disclosure.

With reference to FIG. 7, a press bit 72 has a bottom surface 74 and a protrusion 76 extending from the bottom surface 74. The protrusion 76 is disposed at a center 78 of the bottom surface 74, the center 78 being a point at which the central axis A of the press bit 72 intersects the bottom surface 74. When the press bit 72 rotates and presses against the second metal sheet 24, 50, 66, the protrusion 76 directs semisolid metal to flow away from the center 78 of the bottom surface 74 and toward the aperture 30, 56, 70. The protrusion 76 directs the semisolid metal evenly away from the center 78 such that the cap 38, 52, 64 has a substantially even thickness about a circular direction. The even thickness of the cap 38, 52, 64 reduces variations in load absorption, improving strength of the cap 38, 52, 64. The protrusion 76 reduces or inhibits vibrations from penetrating the second metal sheet 24, 50, 66 with less axial force than a substantially flat bottom surface 36 and reducing deflection of the press bit 72. In the form of FIG. 7, the protrusion 76 is conical such that the semisolid metal flows along the conical surface of the protrusion 76, along the bottom surface 74 of the press bit 72, and then along a flange 80 of the press bit 72. In another form, the geometry of the protrusion 76 is determined to direct flow of the semisolid metal in a specified manner.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for joining a first metal sheet to a second metal sheet, the method comprising:
   placing the first metal sheet onto the second metal sheet;
   translating a rotating bit through an aperture of the first metal sheet and onto a surface of the second metal sheet to form a volume of heated metal from the second metal sheet, wherein a diameter of the aperture is greater than a diameter of the rotating bit; and
   flowing the heated metal from the second metal sheet along the translating and rotating bit, back through the aperture of the first metal sheet, and onto an outer surface of the first metal sheet.

2. The method of claim 1, further comprising solidifying the flowed metal to form a cap extending around an upper portion of the aperture in the first metal sheet.

3. The method of claim 1, wherein the bit further includes a flange arranged to direct the heated metal onto the outer surface of the first metal sheet.

4. The method of claim 1, further comprising heating the surface to a semisolid state to form semisolid metal and, then, flowing the semisolid metal from the surface of the second metal sheet onto the outer surface of the first metal sheet.

5. The method of claim 1, wherein the bit has a substantially flat bottom surface.

6. The method of claim 1, wherein the bit has a protrusion extending from a bottom surface.

7. The method of claim 1, further comprising pressing the rotating bit to a specified depth through the second metal sheet and, then, translating the bit away from the surface of the second metal sheet.

8. The method of claim 1, wherein the first metal sheet and the second metal sheet are dissimilar materials.

9. The method of claim 1, further comprising flowing the heated metal between the outer surface of the first metal sheet and a flange of the rotating bit to contact the flange.

10. The method of claim 1, further comprising flowing the heated metal along the bit beyond the diameter of the aperture of the first metal sheet.

11. The method of claim 10, further comprising flowing the heated metal to form an annulus of the heated metal having an outer diameter greater than the diameter of the aperture.

12. The method of claim 1, wherein the joined first and second metal sheet form a vehicle component.

13. The method of claim 1, wherein a melting temperature of the second metal sheet is lower than a melting temperature of the first metal sheet.

14. The method of claim 1, wherein the first metal sheet has a chamfered surface extending from the outer surface of the first metal sheet to the aperture.

15. The method of claim 14, further comprising flowing heated metal onto the chamfered surface and onto the outer surface of the first metal sheet.

* * * * *